May 28, 1940.  G. C. PEARCE  2,202,165

REFRIGERATING APPARATUS

Original Filed Nov. 30, 1934

INVENTOR.
George C Pearce
BY
Spencer Hardman and Fehr
ATTORNEYS

Patented May 28, 1940

2,202,165

UNITED STATES PATENT OFFICE 2,202,165

REFRIGERATING APPARATUS

George C. Pearce, Dayton, Ohio, assignor to General Motors Corporation, Dayton, Ohio, a corporation of Delaware Application November 30, 1934, Serial No. 755,335
Renewed October 18, 1939

6 Claims. (Cl. 200—122)

This invention relates to refrigerating apparatus and more particularly to motor protecting devices for protecting the motors of such apparatus.

It has been proposed to provide both manual and automatic motor protecting devices in the circuit of an electric motor which are automatically responsive to a flow of current to the motor, or responsive directly to the temperature of the motor. I find that such devices are not entirely satisfactory since sometimes under certain conditions, they fail to properly protect the motor. This unsatisfactory condition ordinarily occurs when repeated attempts to start are made when the motor is not in a proper condition to start, due to an overload or other improper operating conditions.

It is an object of my invention to provide a control for an electric motor which will properly protect the motor and which will be automatic under normal conditions, but which must be manually reset when seriously dangerous conditions occur.

It is another object of my invention to provide a motor protector wherein a means responsive to a flow of current to the motor is provided for automatically opening and closing the circuit in case of abnormal current flow and an additional device operable automatically when the temperature of the motor approaches a dangerous point to open the circuit, but which must be manually reset to close the circuit.

Further objects and advantages of the present invention will be apparent from the following description, reference being had to the accompanying drawing, wherein a preferred form of the present invention is clearly shown.

Figure 1:
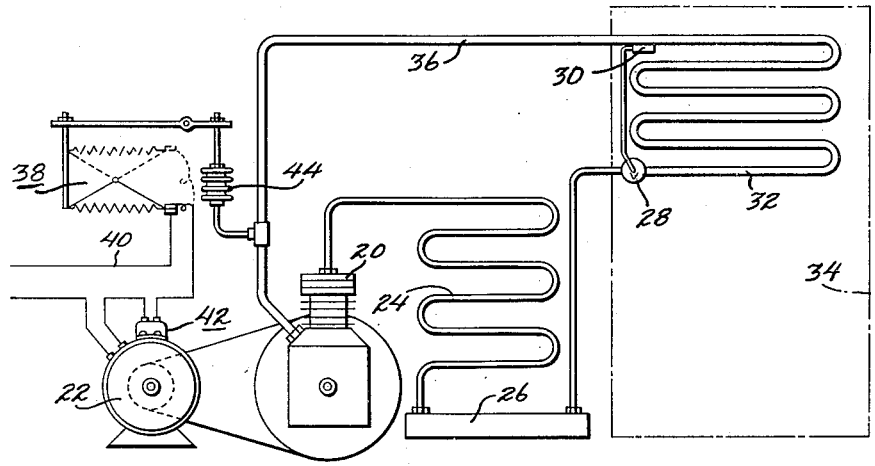
Fig. 1 is a diagrammatic illustration of a refrigerating system including a motor protector embodying my invention.

Referring to the drawing, and more particularly to Fig. 1, there is shown a compressor 20 driven by an electric motor 22 for compressing refrigerant and for forwarding the compressed refrigerant to a condenser 24 where the compressed refrigerant is liquefied and collected in a receiver 26. From the receiver 26, the liquid refrigerant is forwarded to an expansion valve 28, preferably of the thermostatic type, having a thermostat 30 for controlling the flow of liquid refrigerant into the evaporator 32 located within the refrigerated chamber 34. The liquid refrigerant within the evaporator 32 evaporates under reduced pressure, absorbing heat from the atmosphere within the chamber 34. The refrigerant which is evaporated in the evaporator 32 is returned to the compressor through the return conduit 36. The thermostatic bulb 30 is placed in heat exchange relation with the return conduit at the outlet of the evaporator 32 and controls the expansion valve 28 so as to maintain the evaporator 32 substantially filled with liquid refrigerant. The operation of the compressor 20 and the electric motor 22 is controlled by a snap acting switch 38 located in the electric motor circuit 40 in series with the motor protector 42 which is mounted upon the top of the motor 22. The snap acting switch 28 is operated by the bellows 44 connected to the return conduit 36 in order to control the operation of the system according to the temperature of the evaporator 32.

Figure 2:
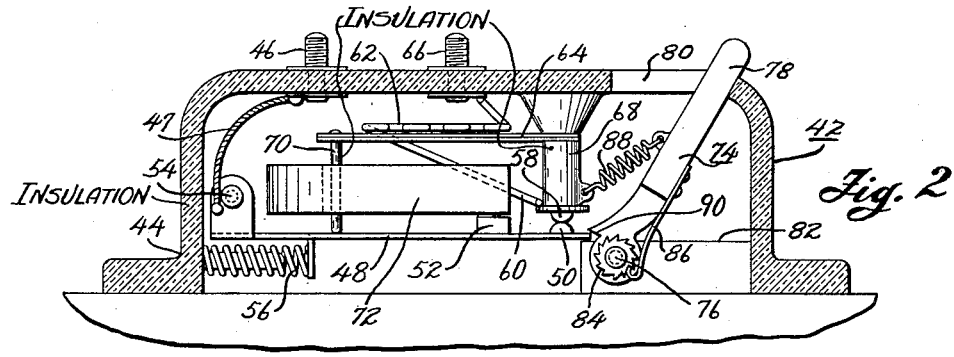
Fig. 2 is a sectional view of the motor protector shown in Fig. 1 with the protector in closed circuit position.

The motor protector 42 is placed in the electric motor circuit to protect the motor from an excessive flow of current, as well as to prevent the motor from becoming overheated. This motor protector is better shown in Figs. 2 and 3 and embodies an insulating casing 44, preferably of some suitable insulating material such as a phenol condensation product which is fastened to the top of the motor by screws or other suitable fastening means. This casing 44 is provided with a binding post 46 on its upper surface which is connected by a flexible electric conductor 47 to a switch lever 48 provided with a contact 50 at its free end, as well as an armature 52. This switch lever 48 is mounted upon the pivot pin 54 and urged in a counter-clockwise direction about the pivot pin by the coil spring 56.

The contact 50 cooperates with a second contact 58 which is connected by a conductor 60 to a serpentine heater wire 62 which in turn is connected to a second binding post 66. The serpentine heater wire is positioned directly adjacent, but out of contact with, a bimetal strip 64 which is anchored at one end to an insulating post 68 projecting downwardly from the top wall of the casing 44 and which also supports the stationary contact 58. The free end of the bimetal strip 64 is provided with a pin 70 of insulating material which extends downwardly and is normally just out of contact with the switch lever 48. Between the bimetal strip 64 and the switch lever 48 is a horse-shoe shaped permanent magnet 72 which has its open end portion in a position to attract the armature 52 on the switch lever 48 when the switch lever is in closed position.

Figure 3:
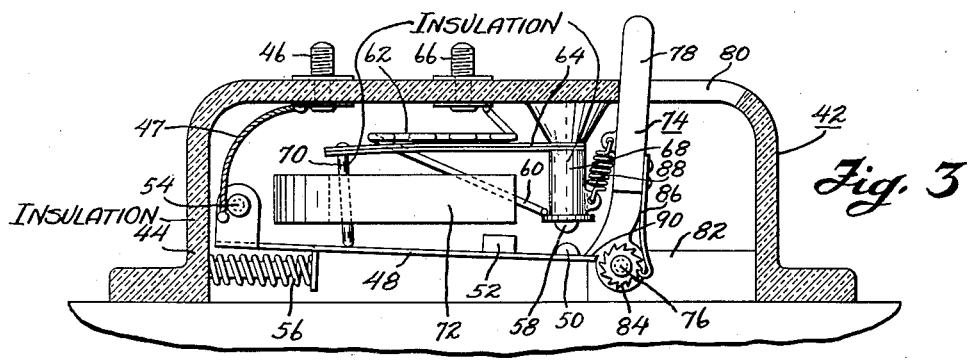
Fig. 3 is a sectional view of the motor protector with the protector tripped to open circuit position.

When the bimetal strip 64 is heated a considerable amount, such as by an excessive flow of current through the serpentine wire heater 62, or by heat directly from the motor, the free end of the bimetal strip will bend downwardly as shown in Fig. 3 and through the pin 70 move the switch lever 48 downwardly in a clockwise direction about its pivot point against the force of the spring 56 and the attraction of the permanent magnet which causes the contacts 50 and 58 to be separated with a sort of snap action. Normally, the bimetal strip 64 then slowly cools and slowly returns to its original position, permitting the spring 56 and the attraction of the permanent magnet for the armature 52 to eventually overcome the remaining force exerted by the cooling bimetal strip at which time the contacts 50 and 58 are then moved to close position with a snap action.

At the right of the contacts 50 and 58, there is provided a manually operable lever 74 pivoted upon a pin 76 and having a handle portion 78 extending through a slot 80 in the casing 44. The pin 76 projects from and is supported by a metal block 82 in heat exchange relation with the motor. This pin 76 has a ratchet wheel 84 soldered thereon. The lever 76 has a spring pawl 86 riveted thereto having a hooked end portion which engages the teeth of the ratchet wheel 84. A tension coil spring 88 connects the lever 76 with the post 68 and urges the lever 74 in a counter-clockwise direction about the pin 76. This, however, is normally prevented by the spring pawl 86. The lever 74 is also provided with a projection 90 which is adapted to engage the extreme end portion of the switch lever 48 when the lever 74 turns in a counter-clockwise direction about its pivot pin 76 to thereby move the switch lever 48 downwardly under the tension of the spring 88 to move the contacts 50 and 58 to open circuit position.

When the electric motor 22 becomes very warm and approaches a dangerous condition, the solder which holds the ratchet wheel 84 and prevents it from rotating becomes heated and melts, thereby permitting the rotation of the lever 74 under the influence of the spring 88 to forcibly move the switch lever 48 to open circuit position and holds it in that position. The motor then cannot be restarted until the lever 74 is manually reset to the position shown in Fig. 2 after the solder has become hard. This makes it impossible for the motor to start without calling someone's attention to the tripping of the overload mechanism. In this way, a warning is given that something is wrong with the mechanism. As the motor cools, the solder which holds the ratchet wheel also cools and again holds the ratchet wheel from rotation. The lever 74 may then be reset to the position shown in Fig. 2 so that the pawl 86 will prevent the lever 74 from holding open the contacts until the motor should again overheat and melt the solder.

By this protector, I have protected the motor against excessive current flow and overheating. I have provided a means which serves as an indication of overheating the motor and which thus makes it possible for a service man to be called in order to inspect the apparatus and locate and repair the difficulty before restarting the motor.

While the form of embodiment of the invention as herein described constitutes a preferred form, it is to be understood that other forms might be adopted, all coming within the scope of the claims which follow.

What is claimed is as follows:

1. A control means to be mounted upon and in heat exchange relation with a device, said control means having a heater energized by an electric circuit, said control means having a thermal responsive element heated by said heater and said device, switch means controlled by said thermal responsive element for opening said electric circuit when said thermal responsive element is heated to a certain temperature and for closing said circuit when the thermal responsive element has cooled, and means independent of said thermal responsive element but responsive to the temperature of said device for holding open said switch means.

2. A control means to be mounted upon and in heat exchange relation with a device, said control means having a heater energized by an electric circuit, said control means having a thermal responsive element heated by said heater and said device, switch means controlled by said thermal responsive element for opening said electric circuit when said thermal responsive element is heated to a certain temperature and for closing said circuit when the thermal responsive element has cooled, and means responsive to the temperature of said device for holding open said switch means, and manual means for resetting said last mentioned means.

3. A control means to be mounted in heat exchange relation with a device energized by an electric circuit, said control means including switch means for controlling the energization of said device, automatically resettable temperature responsive means, manually resettable temperature responsive means, said automatically resettable temperature responsive means being responsive to the heating effect of electric energy flowing through said electric circuit for controlling said switch means and the manually resettable temperature responsive means being responsive to the temperature of said device for controlling said switch means.

4. A control means to be mounted in direct heat exchange relation with an energy translating device energized by an electric circuit, said control means including switch means for controlling the energization of said device, automatically resettable temperature responsive means, manually resettable temperature responsive means, one of said temperature responsive means being responsive to the heating effect of electric energy flowing through said electric circuit and to the temperature of said device for controlling said switch means, and the other temperature responsive means being in direct metallic heat exchange relation with the energy translation device and energy translating device responsive to the temperature of said device for controlling said switch means.

5. A control means to be mounted in heat exchange relation with a device energized by an electric circuit, said control means including switch means for controlling the energization of the device, automatically resettable temperature responsive means responsive to the heating effect of the electric energy through said electric circuit and to the temperature of said device for controlling said circuit means, and manually resettable temperature responsive means responsive to the temperature of said device for controlling said switch means.

6. A control means for controlling an energy translating device energized by current flowing through an electric circuit including a switch mechanism for controlling said energy translating device, an automatically resettable current responsive means responsive to the current flowing through said electric circuit for controlling said switch mechanism, and a manually resettable temperature responsive means responsive to temperature conditions of said energy translating device for controlling said switch mechanism.

GEORGE C. PEARCE.